M. SCHOU & T. WEST.
KEY-HOLE GUARDS.

No. 181,728. Patented Aug. 29, 1876.

Attest:
H. L. Perrine
Edwin H. Brown

Inventors.
Mathias Schou.
Thomas West.
By Attorney
Wm. H. Finckel

UNITED STATES PATENT OFFICE.

MATHIAS SCHOU AND THOMAS WEST, OF ENGLISHTOWN, NEW JERSEY.

IMPROVEMENT IN KEY-HOLE GUARDS.

Specification forming part of Letters Patent No. 181,728, dated August 29, 1876; application filed August 2, 1876.

*To all whom it may concern:*

Be it known that we, MATHIAS SCHOU and THOMAS WEST, of Englishtown, in the county of Monmouth and State of New Jersey, have invented certain new and useful Improvements in Key-Hole Guards, of which the following is a full, clear, and exact description:

This invention is in the nature of an improvement on the device shown in Patent No. 178,334, of June 6, 1876, granted to Mathias Schou, assignor of one-half of his right to Thomas West.

The invention consists in a key-hole guard composed of a sliding, removable, and adjustable slotted guard-plate having a tapering hub, a guard-plate carrying-stem having a retaining-lug, and a bit and hub, the three several parts being connected together so as to be readily separable, substantially as and for the purposes hereinafter specified.

Figure 1:
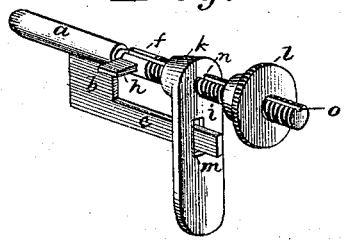
Figure 3:
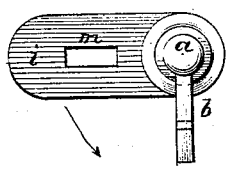
Figure 4:
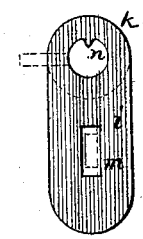
Figure 2:
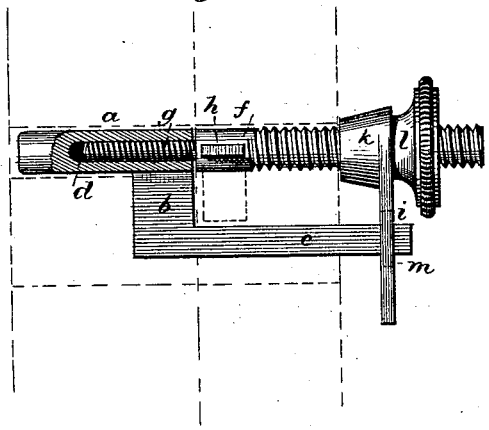

In the drawings illustrating our invention, Figure 1 is a perspective view; Fig. 2, an enlarged side view, partly sectional; Fig. 3, a rear-end view, showing the parts in position for insertion in the lock; and Fig. 4, a front view of the guard-plate.

The letter $a$ designates the hub carrying the bit $b$, which latter is made with a tongue, $c$, extending forward of the hub. $d$ is a threaded socket in hub $a$, adapted to receive a screw, $g$, formed on the stem $f$. The stem $f$ has the retaining-lug $h$, and a groove, $o$, said groove extending longitudinally of the stem from its outer end to the lug; and said lug projects from the stem at right angles to the groove. $i$ is the guard-plate, having a smoothly-bored tapering hub, $k$, and sliding easily on the stem $f$. Said guard-plate has a slot, $m$, formed in its face, through which the bit-tongue $c$ projects when the guard is applied, so as to lock the two. A feather, $n$, is made in the bore of the hub $k$, of a size and shape to fit in the groove $o$, whereby the stem $f$ and guard-plate are made to turn together. $l$ is a nut, adjustable against the hub $k$, and on the stem $f$, which is screw-threaded for the purpose.

To apply this guard to a key-hole the guard-plate is turned at right angles to the bit, so as to cause the lug $h$ of stem $f$ to register or come in line with the bit, as shown in Fig. 3, when the bit, &c., may be inserted in the key-hole. The guard-plate is then turned back, and the nut $l$ screwed up until the guard-plate is brought tightly against the lock-case.

It will be understood that the guard-plate shall be turned sufficiently far to bring its slot in line with the tongue, so that the tongue may pass through it; and when so turned the lug $h$ will be at right angles to the guard-plate, and engage with some fixed portion of the lock as its case, so as to act as a stop for holding the guard within the key-hole.

When the nut is screwed up as firmly as may be, the guard is almost immovably fixed in the key-hole, so that it is impossible to dislodge it from without, and the bit and hub being of such size as to nearly or quite fill ordinary key-holes, it will be impossible also to insert false keys or picking instruments in the lock, the guard-plate at the same time serving to protect the key-hole, so as to prevent seeing through it.

By making the bit-tongue project through the slot $m$ in the guard-plate, the stem $f$ is prevented from turning.

The ends accomplished by securing the hub $a$ and stem $f$ together by a screw, or other swiveling, turning, sliding, or adjustable joint, are that the parts may be readily separated for packing, the guard-plate and nut being also detached; also, that the guard may be lengthened to fit key-holes of various depths through, and also primarily to permit the turning of the stem in applying the guard to a key-hole.

The hub $k$ of the guard-plate is made tapering toward the bit, so as to enter and be jammed in large or other key-holes, and thereby aid in holding the device tightly in place.

By securing the bit-hub and stem $f$ together with a socket-joint, there is nothing of the joint exposed to drilling or filing, and a solid hub is presented on the outside of the lock or door.

Having thus described our invention, what we claim is—

1. The slotted guard-plate $i$, having a feather, $n$, the grooved stem $f$, and tongue $c$, combined substantially as and for the purpose specified.

2. The guard-plate $i$, having a tapering hub, substantially as and for the purpose set forth.

3. A key-hole guard, consisting of the combination of a sliding, removable, and adjustable slotted guard-plate, a guard-plate carrying-stem having a retaining-lug, and a bit and hub, substantially as specified.

<div style="text-align:right">M. SCHOU.<br>THOMAS WEST.</div>

Witnesses:
  B. A. NAYLOR,
  JOHN H. LAIRD.